No. 810,496. PATENTED JAN. 23, 1906.
C. J. MONFORT, DEC'D.
A. M. DUNN, ADMINISTRATRIX.
STEAM HEATER FOR WARMING AND MOISTENING FOODS.
APPLICATION FILED JAN. 9, 1904.
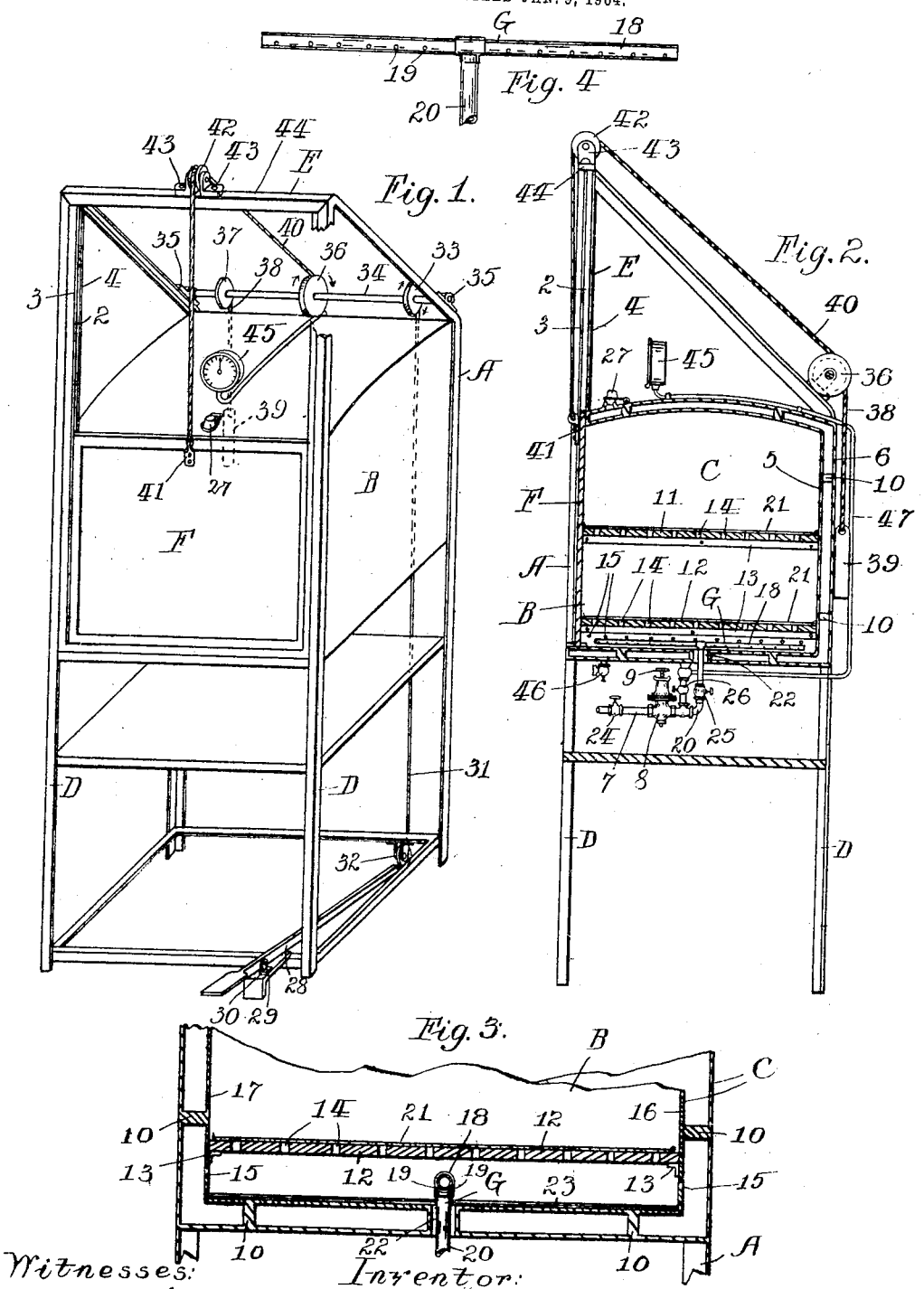
Witnesses:
E. M. Dousel.
W. H. Williams.
Inventor:
Charles J. Monfort,
by Stryker & Bradbury
Attorneys.

UNITED STATES PATENT OFFICE.

CHARLES J. MONFORT, OF ST. PAUL, MINNESOTA; ALICE MONFORT DUNN ADMINISTRATRIX OF SAID CHARLES J. MONFORT, DECEASED.

STEAM-HEATER FOR WARMING AND MOISTENING FOODS.

No. 810,496. Specification of Letters Patent. Patented Jan. 23, 1906.

Application filed January 9, 1904. Serial No. 188,281.

*To all whom it may concern:*

Be it known that I, CHARLES J. MONFORT, a citizen of the United States of America, and a resident of St. Paul, in the county of Ramsey and State of Minnesota, have invented certain new and useful Improvements in Steam-Heaters for Warming and Moistening Foods, of which the following is a specification.

My invention relates to improvements in steam-heaters for warming and moistening foods. Its object is to provide a heater that will warm and moisten foods and other materials and keep them at an even temperature. Further objects are a heater that is cleanly and may be easily and quickly opened, automatically closed, and its temperature adjusted.

This device may be used with equal efficiency for cooling purposes when connected with a supply of cold air.

In the accompanying drawings, forming part of this specification, Figure 1 is a perspective view of my invention. Fig. 2 is a sectional side view. Fig. 3 is a detail sectional view, and Fig. 4 is a detail side view of the sprayer.

In the drawings let A represent a skeleton frame; B, an inclosure, which is formed by the walls C, attached to the frame; D, the legs supporting the inclosure, and E the overhead portion of the frame for supporting the working parts. The frame, preferably constructed of angle-iron, has the vertical channels 2, formed by the flanges 3 and 4, in which the door F is adapted to slide. The inclosure has inner and outer walls 5 and 6, which form a jacket into which steam is introduced when the device is used as a heater or cold air when used as a cooler by means of the pipe 7. A pressure-reducing valve 8 is connected with said pipe and regulated by turning the handle 9 to vary the pressure of steam or air in the jacket. Stays 10 are fastened between the walls of the inclosure, so as to prevent the pressure of steam in the jacket from bulging and straining the walls. Horizontal trays 11 and 12 rest on the supports 13 and are provided with openings 14 to increase circulation of steam or cold air in the inclosure, which is admitted through the perforations 15 in the inner walls 16 and 17 and through the sprayer G. This sprayer consists of a horizontal pipe 18, having closed ends, a series of perforations 19, and a branch pipe 20, which connects with the main pipe 7. The steam or air after it has been sprayed through the perforations rises through the openings in the trays and moistens or cools the foods or materials, which are supported by the trays. Cloths 21 on the trays spread the moisture from the steam and air by capillary attraction and tend to more evenly diffuse the same in the inclosure. The branch pipe 20 passes upwardly through the passage-way 22 in the base 23. The surface of the base declines toward the passage-way for the purpose of draining condensation from the inclosure. Hand-valves 24, 25, and 26 are connected with the main and branch pipes, and a safety-valve 27 is connected with the jacket. The door F is opened by pressing the foot on the power end of the foot-lever 28, which is pivoted between its ends at 29 on the clips 30, fastened to the skeleton frame. A chain 31 is connected to the work end of the foot-lever, passes around the pulley 32, and is fastened on the periphery of the pulley 33, which is carried by the shaft 34 on the overhead portion E of the skeleton frame. This shaft is journaled on the frame at 35 and also carries pulleys 36 and 37. The pulley 36 is of greater diameter than the pulley 33, and the pulley 37 has a chain 38 and counterweight 39 connected to its periphery. The ends of the chain 40 are fastened to the periphery of the pulley 36 and the clip 41 on the door F. This chain passes over the loose pulley 42, which is journaled by the clips 43 on the cross-piece 44 of the overhead portion of the skeleton frame. When the power end of the lever 28 is pressed down by the foot, the shaft 34 is turned in the direction of the arrows and winds the chain 40 on the pulley 36, thus raising the door and opening the inclosure. The weight 39 tends to revolve the shaft in the direction of the arrows and relieves part of the weight of the door when the lever is pressed down. By removing the foot from the lever the door closes by its own weight. A vent-cock 46 is connected with the jacket for drawing off any condensation therein.

In operation the door is opened and the food placed upon the cloths. The valves 24, 25, and 26 are opened and steam or air admitted into the jacket and sprayed into the inclosure. The pressure of this steam or air in the jacket is shown by the indicator 45, which is connected by the pipe 47 with the pipe 7. The pressure-valve is regulated by turning the handle 9 to regulate the pressure of the steam or air, so as to keep the food or material at the desired degree of temperature and moisture.

Having described my invention, what I claim as new, and desire to protect by Letters Patent, is—

1. A steam-heater for warming and moistening foods, consisting, in combination, of a jacketed inclosure provided with perforated inner walls, a sprayer in said inclosure, a pipe connecting with said sprayer and the jacket of said inclosure, a pressure-regulating valve connected with said pipe, and a frame for supporting said parts.

2. A steam-heater for warming and moistening foods, consisting, in combination, of an inclosure formed by a steam-jacket, a sprayer in said inclosure, a steam-pipe connecting with said jacket and sprayer, a pressure-regulating valve connected with said pipe, and a frame for supporting said parts.

3. A steam-heater for warming and moistening foods, consisting, in combination, of a jacketed inclosure provided with perforations in its inner walls for admitting steam into said inclosure, a sprayer in said inclosure, a pipe connected with said jacket and sprayer, a pressure-regulating valve connected with said pipe, a door in said inclosure, and a frame for supporting said parts.

4. A steam-heater for warming and moistening foods, consisting, in combination, of a jacketed inclosure, trays in said inclosure provided with openings therethrough, a sprayer below said trays, a pipe connected with said jacket and sprayer, a pressure-regulating valve connected with said pipe, and a door in said inclosure.

5. A steam-heater for warming and moistening foods, consisting, in combination, of a jacketed inclosure provided with perforated inner walls for admitting steam into said inclosure, trays in said inclosure provided with openings therethrough, a sprayer below said trays, a pipe connected with said jacket and sprayer, a pressure-regulating valve connected with said pipe, a door in said inclosure, and a frame for supporting said parts.

6. A steam-heater for warming and moistening foods, consisting, in combination, of a jacketed inclosure provided with perforated inner walls for admitting steam into said inclosure, a sprayer in said inclosure, a pipe connected with said jacket and sprayer, a pressure-regulating valve connected with said pipe, trays in said inclosure provided with openings, and distributing-cloths resting upon said trays.

7. A steam-heater for warming and moistening foods, consisting, in combination, of a jacketed inclosure provided with perforated inner walls for admitting steam into said inclosure, a sprayer in said inclosure, a steam-pipe connected with said jacket and sprayer, trays in said inclosure provided with openings, and cloths resting upon said trays.

8. A steam-heater for warming and moistening foods, consisting, in combination, of a jacketed inclosure provided with a perforated inner wall for admitting steam into said inclosure, a steam-pipe connected with said jacket, a pressure-regulating valve connected with said pipe, a tray in said inclosure provided with openings, a distributing-cloth resting upon said tray, and a door in said inclosure.

9. A steam-heater for warming and moistening foods, consisting, in combination, of a jacketed inclosure provided with perforated inner walls for admitting steam into said inclosure and with a vent through its floor, a sprayer in said inclosure, a steam-pipe connected with said jacket and sprayer, and a pressure-regulating valve connected with said pipe.

In testimony whereof I have signed my name to this specification in the presence of two subscribing witnesses.

CHARLES J. MONFORT.

Witnesses:
E. M. BOESEL,
F. G. BRADBURY.